United States Patent
Van Boxstael et al.

(10) Patent No.: US 6,495,757 B2
(45) Date of Patent: Dec. 17, 2002

(54) CABLE JOINT USING A SEMI-CONDUCTIVE TUBULAR ASSEMBLY AND METHOD TO OBTAIN A SMOOTHLY SHIELDED CONNECTOR

(75) Inventors: Eddy Van Boxstael, Vlierzele (BE); Josef Cardinaels, Wetteren (BE); Jo De Buyst, Lede (BE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/986,550

(22) Filed: Nov. 9, 2001

(65) Prior Publication Data

US 2002/0056567 A1 May 16, 2002

(30) Foreign Application Priority Data

Nov. 10, 2000 (EP) .............................................. 00403144

(51) Int. Cl.[7] ................................................. H01R 4/00
(52) U.S. Cl. ..................................................... 174/88 R
(58) Field of Search .............................. 174/88 R, 73.1, 174/DIG. 8, 84 R

(56) References Cited

U.S. PATENT DOCUMENTS 3,717,717 A 2/1973 Cunningham et al.
4,479,031 A * 10/1984 Ishise et al. ................ 174/73.1

FOREIGN PATENT DOCUMENTS

| EP | 1 009 083 A2 | 6/2000 |
|----|--------------|--------|
| GB | 2 254 739 A  | 10/1992 |
| GB | 2 262 396 A  | 6/1993 |
| GB | 2 272 803 A  | 5/1994 |

* cited by examiner

Primary Examiner—Chau N. Nguyen
(74) Attorney, Agent, or Firm—Sughrue Mion, PLLC

(57) ABSTRACT

A semi-conductive tubular assembly (30) or molded rubber cap is used in a cable joint for medium voltage electric power cables (10, 20). The conductors (13, 23) of the cables are connected together by a connector (40) constituted by a bolted contact assembly having a tubular shape and wherein the conductor ends are maintained by bolts. Two rubber caps (30a, 30b) preferably overlap each other in the middle of the connector. Each cap has an internal shape adapted to compensate for the gap resulting from the difference in diameter between the conductor insulation and the connector, as well as for the eccentric position of the latter with respect to the conductors. By mating the change of shape (31a, 31b) between the underlying connector (40) and the conductor insulation (12, 22), the caps provide a relatively cheap and efficient solution for an electrically reliable product, e.g. by reducing local electric stresses. In addition covering the sharp edges, mainly of the underlying connector, the molded rubber cap has an outer surface that provides a conical transition with a relatively slow slope for smoothing the above diameter transition.

13 Claims, 1 Drawing Sheet

CABLE JOINT USING A SEMI-CONDUCTIVE TUBULAR ASSEMBLY AND METHOD TO OBTAIN A SMOOTHLY SHIELDED CONNECTOR

BACKGROUND OF THE INVENTION

The present invention relates to a cable joint between two medium voltage electric power cables, each cable having a conductor surrounded by a conductor insulation and a semi-conductive layer, said cable joint comprising:

a connector constituted by a bolted contact assembly having a tubular shape and being adapted for connecting together bared ends of said conductors engaged in said contact assembly and maintained therein by means of bolts; and an insulating sleeve adapted for covering at least said connector.

Such a cable joint is already known in the art, e.g. from the UK Patent Application GB-A-2 254 739 entitled "Cable Joint" by J. W. Weatherley et al. (Raychem Limited), first filed on Mar. 25, 1991. The connector used in this known cable joint is covered by a heat shrinkable insulating sleeve, generally known as joint-body. The heat shrinkable joint-body is positioned over the connector and caused to shrink by heating and, once the heating is removed, the joint-body remains in place. The retracted joint-body tends to follow the shape of the underlying connector and conductor insulation of each cable. However, there are remaining gaps at the location where the diameters change, i.e. between the conductor insulation and the contact assembly, as well as other gaps due to the irregular shape of this bolted contact assembly.

The difference in diameter between the conductor insulation and the contact assembly is mainly due to the fact that the bolted contact assembly generally covers a wide range of cross-sections, e.g. from 50 to 300 $mm^2$, and is thus larger than the conductor insulation. Such a bolted contact assembly is for instance known in the art from the UK Patent Application GB-A-2 262 396 entitled "Connector for elongate objects" by D. J. Hollick (B & H), first filed on Dec. 14, 1991. Additionally to the fact that the diameter of the bolted contact assembly is bigger than the diameter of the conductor insulation, it is further positioned eccentrically with respect to the conductor. This is due to the presence of the bolts which still increase the dimensional difference between conductor insulation and the connector. As a result, the insulating sleeve is not able to closely follow the contours of the conductor insulation and of the bolted contact surfaces, leaving a large air gap in front of the contact, right at the electrically speaking most critical point of the joint. This is a problem, especially for applications above 10 or 15 kVolt.

In the known cable joint, these gaps are reduced by wrapping the connector with an amount of insulating mastic.

However, it is difficult to determine how much filling has to be put into the gaps under the insulating sleeve. Furthermore, the mastic used to compensate for the gaps may flow away, e.g. during temperature cycles. The insulating sleeve, being relatively rigid once retracted, might not compensate for this flow, resulting in the appearance of more gaps.

Another problem with the known cable joint is that high electrical fields exist at the edges of the connector. These local electrical stresses may result in partial discharges and in product failure.

SUMMARY OF THE INVENTION

An object of the present invention is to provide a cable joint of the above known type but which is better adapted to sustain local electric stresses, especially at the intersection between the connector and the conductor insulation, while being also better adapted to take into account the diameter differences of the items under the insulating sleeve.

According to the invention, this other object is achieved due to the fact that said cable joint is further provided with two molded caps of semi-conductive rubber covering part of the conductor insulation of the two cables and joining each other over said connector, each of said caps having an internal shape adapted for being engaged over the connector and over the conductor insulation and for mating the change of dimension between said connector and said conductor insulation.

In this way, a relatively cheap and efficient solution is provided to compensate for the gap resulting from the difference in diameter between the conductor insulation and the connector, as well as for the eccentric position of the latter. Furthermore, the semi-conductive material used for making the caps provides a better distribution of the electrical fields around the connector and thus an electrically more reliable product than that of the known prior art.

Another characterizing embodiment of the present invention is that each of said molded caps has an external shape adapted for smoothing the transition from the external diameter of said conductor insulation to the external diameter of said connector by providing an external conical transition with a relatively slow slope.

This characteristic of the caps having an outer surface smoothing the sharp edges of the contact, e.g. the shearing bolts, is also beneficial to reduce local electric stresses.

Also another characterizing embodiment of the present invention is that said two molded caps overlap each other in the middle of the connector.

In this way, the molded caps are usable for different lengths of bolted contacts. The overlapping further ensures that the underlying connector is not exposed.

Still another characterizing embodiment of the present invention is that said insulating sleeve is a cold shrinkable joint-body adapted, when retracted, to cover said connector covered by said molded caps, the conductor insulation and part of the semi-conductive layer of both said cables.

The heat shrinkable joint-body known from the above first mentioned UK Patent Application is caused to retract by heating. In this condition the material becomes elastic and is able to exert pressure on the underlying filling, but once cooled down, it becomes rigid again and will not compensate for flowing of the filling material. On the other hand, a cold shrinkable joint-body is positioned by removing the support tube that maintains it in an expanded status. When retracted over the connector, the cold shrinkable joint-body exerts a pressure on the underlying layers. This pressure is maintained for ever, without any heating, and all the underlying items, including any filling mastic, are so maintained in place.

Yet another characterizing embodiment of the present invention is that said cold shrinkable joint-body comprises an inner layer of insulating mastic, an intermediate layer of insulating material and an outer layer of semi-conductive material.

This mastic is conformed by the shrinking joint body and fills any possible remaining irregularities over the connector and conductor insulation area.

The present invention also relates to a method of forming a joint between two medium voltage electric power cables, each cable having a conductor surrounded by a conductor insulation itself surrounded by a semi-conductive layer, the end of the semi-conductive layer being cut-back to expose a bared end of said conductor insulation and the end of the conductor insulation being removed to expose a bared end of said conductor.

In this method:

a molded cap, having a first section with a first internal diameter adapted for being engaged over said conductor insulation and a second section with a second internal diameter adapted for being engaged over a connector, is engaged over each of said conductor insulations;

the bared conductor ends of the two cables are connected together by means of said connector constituted by a bolted contact assembly having a tubular shape, said conductor ends being maintained therein by means of bolts; and the molded caps are slid over said connector until they joint each other with their second section covering said connector, said caps having, between their first and their second section, an internal shape adapted for mating the change in dimension between said first and said second internal diameter.

In this way, a cable joint is obtained whereof the internal shape of the caps closely follows the contours of the underlying conductor insulation and external surface of the bolted contact assembly, reducing and electrically neutralizing thereby any possible air gap between these items.

Another characterizing embodiment of the present method is that each of said molded caps has an external shape adapted for smoothing the transition from the external diameter of said conductor insulation to the external diameter of said connector by providing an external conical transition with a relatively slow slope.

A conductor connector area with a smoother outer surface is so obtained.

The present invention further also relates to a tubular assembly for a cable joint adapted for covering a connector constituted by a bolted contact assembly adapted for connecting together bared ends of conductors of two medium voltage electric power cables.

A further object of the present invention is to provide a tubular assembly able to improve the quality of the cable joint.

According to the invention, this object is achieved due to the fact that said tubular assembly is constituted by two molded caps made of semi-conductive rubber and joining each other over the connector, and that each of said molded caps has an internal shape adapted for being engaged over said connector and the insulation of said conductor and for mating the change of shape between said connector and said conductor insulation.

In this way, the internal shape of the caps closely follows the contours of the underlying conductor insulation and the external surface of the bolted contact assembly, reducing and electrically neutralizing thereby any possible air gap between these items.

Another characterizing embodiment of the present invention is that each of said molded caps has an external shape adapted for smoothing the transition from the external diameter of a conductor insulation of said cable to the external diameter of said connector by providing an external conical transition with a relatively slow slope.

In this way, the connector has a smoother outer surface with all the advantages thereof, e.g. reducing the electrical stresses and allowing the joint body to adapt better to the underlying surface.

Further characterizing embodiments of the present cable joint using a semi-conductive tubular assembly, method for obtaining such a cable joint and tubular assembly for this type of cable joint are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
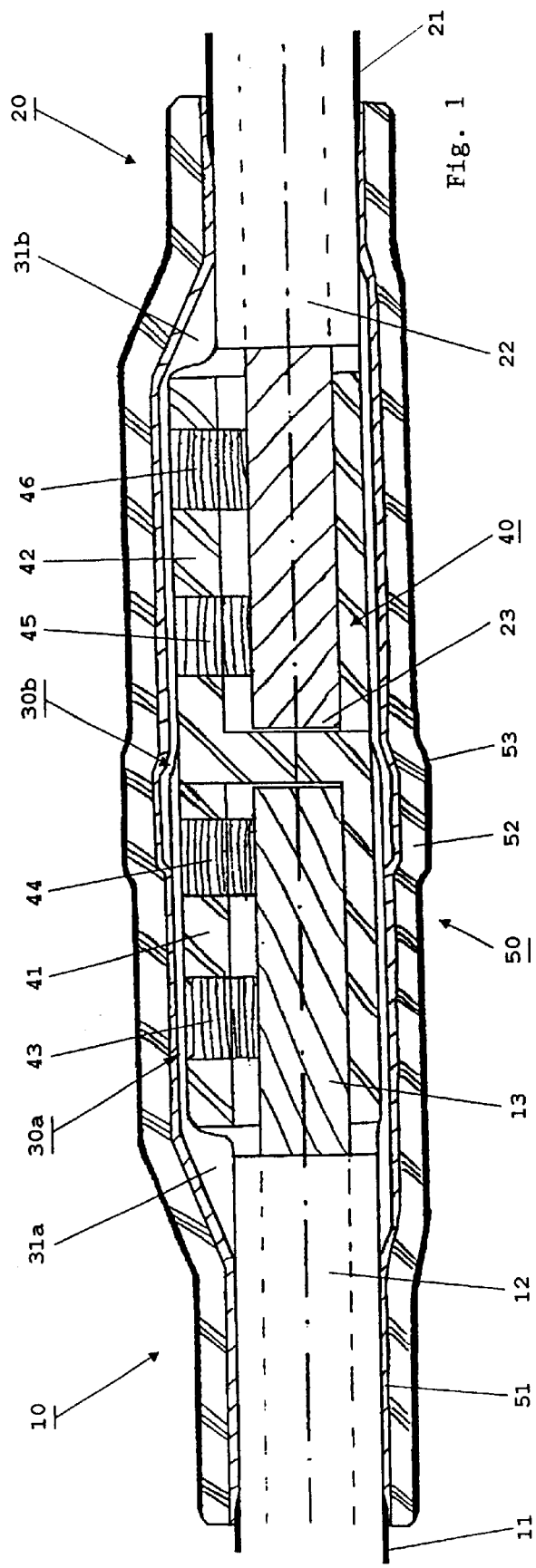
FIG. 1 represents a longitudinal cross-section of a cable joint according to the invention and comprising two semi-conductive tubular assembly or molded caps 30a and 30b.

The description that follows concerns a cable joint for interconnecting two "medium" voltage electrical cables 10 and 20, e.g. cables for above 10 kVolt, and of which a longitudinal cross-section is schematically represented at FIG. 1. Although a single core cable will be considered hereafter, the specification also applies to a multi-core cable such as for instance a three-core cable.

To realize the joint, facing ends of the cables 10 (at the left in FIG. 1) and 20 (at the right in FIG. 1) are first prepared for the connection. A cold shrinkable insulating sleeve or joint-body 50 expanded on a plastic support tube (not shown), is slid over one of the cables.

The outer sheaths (not shown) of the cables are then removed until an underlying extruded semi-conductive coating 11/21, of the cable 10/20 respectively, is exposed. The end of each semi-conductive coating is cut in order to expose the end of an underlying conductor insulation 12/22. The cable preparation is completed by removing a part of the conductor insulation 12/22 to expose a bared end of the conductor 13/23 of each cable 10/20, respectively.

Figure 2:
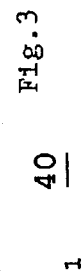
FIG. 2 represents a longitudinal cross-section of a molded cap 30 as shown at FIG. 1.

A molded semi-conductive rubber cap, generally indicated by arrow 30, and of which a longitudinal cross-section is shown at FIG. 2, is then engaged over the conductor insulation 12/22 of each cable 10/20. The molded cap 30 is a semi-conductive tubular assembly with a first section (at the left in FIG. 2) having an internal diameter slightly smaller than the external diameter of the conductor insulation 12/22 and with second section (at the right in FIG. 2) having an internal diameter larger than that of the first section. The internal diameter of the first section is adapted to be engaged over the conductor insulation 12/22, whilst the internal diameter of the second section is adapted to be engaged over a connector or tubular conductor joint wherein the bared conductor ends will be fixed. The two caps have a relatively short length and cover a wide range of cable diameters and connector types.

Figure 3:
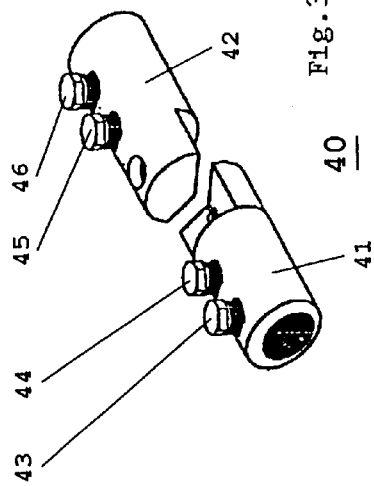
FIG. 3 shows a bolted contact assembly 40 used as tubular connector or conductor joint in the cable joint of FIG. 1.

The connector or conductor joint is preferably a tubular bolted contact assembly 40 as shown at FIG. 3. The connector 40 comprises two complementary and mating parts 41 and 42. Each tubular part 41/42 is adapted to receive the barred conductor end 13/23 that is maintained therein by means of bolts 43, 44, 45 and 46. When the conductors are fixed into the tubular parts 41 and 42, the latter are fixed together and the heads of the bolts are broken-off in order to smooth the external surface of the connector. Characterizing embodiments of such a connector may be found in the above mentioned UK Patent Application GB-A-2 262 396 and this tubular connector or bolted contact assembly will therefore not be described in more detail hereafter.

A bolted contact assembly is now generally used as connector for interconnecting the conductors of energy cables because it covers a wide range of cross-sections, e.g. from 50 to 300 mm$^2$.

Once the conductors 13 and 23 are fixed in the respective parts 41 and 42 of the connector 40, the latter parts are interconnected and the bolts are sheared, the two molded caps 30, say 30a and 30b, are slid back over the connector 40 until they cover it completely. The molded caps 30a and 30b overlap each other in the middle of the connector 40. The internal shape of each molded cap has a conical transition from its first section covering the conductor insulation 12/22 to its second section covering the larger connector. This conical transition, labeled 31 in FIG. 2 and 31a, 31b in FIG. 1, also takes into account the eccentric position of the connector 40 with respect to the conductors 13 and 23. This eccentric position is due to the presence of the bolts 43 to 46.

In addition to covering the sharp edges of the connector, the molded rubber cap has an external shape adapted for smoothing the above diameter transition. This external shape is a smooth outer surface provided by a conical transition with a relatively slow slope.

Because the rubber caps 30a and 30b are made of semi-conductive material, the electrical field around the connector 40 is equally distributed so that the local electric stresses are reduced.

The joint-body assembly, comprising the above mentioned cold shrinkable insulating joint-body 50 expanded on a plastic support tube, is positioned over the connector and conductor insulation, and allowed to shrink by removing the support tube. When shrunk, the insulating joint-body 50 covers the joint including the ends of the semi-conductive coatings 11 and 21.

It is to be noted that such a joint-body assembly is well known by a person normally skilled in the art and will therefore not be explained in more detail hereafter. It is however important to know that the shrunk joint-body 50 preferably comprises an inner layer of insulating mastic 51, an intermediate layer of insulating material 52 and an outer thin layer of semi-conductive material 53.

The insulating layer of mastic 51, possibly but not necessarily with a high dielectric constant, is used to fill up possible gaps under the sleeve or joint-body 50. When the sleeve shrinks, it conforms the mastic to fill the remaining irregularities around the connector area and over the conductor insulation 12, 22. Furthermore, when shrunk, the cold shrinkable joint-body 50 exerts, onto the underlying layers, a permanent pressure that causes the mastic to flow and fill any possible appearing gaps resulting from movements during thermal cycles.

The intermediate insulating material 52 is for instance EPDM or silicone rubber.

While the principles of the invention have been described above in connection with specific apparatus, it is to be clearly understood that this description is made only by way of example and not as a limitation on the scope of the invention, as defined in the appended claims.

What is claimed is:

1. A cable joint between two medium voltage electric power cables, each cable having a conductor surrounded by a conductor insulation and a semi-conductive layer, said cable joint comprising:

a connector constituted by a bolted contact assembly having a tubular shape and being adapted for connecting together bared ends of said conductors engaged in said contact assembly and maintained therein by means of bolts; and an insulating sleeve adapted for covering said connector, characterized in that said cable joint is further provided with two molded caps of semi-conductive rubber covering part of the conductor insulations of the two cables and joining each other over said connector, each of said caps having an internal shape adapted for being engaged over the connector and over the conductor insulation and for mating the change of dimension between said connector and said conductor insulation.

2. The cable joint according to claim 1, characterized in that each of said molded caps has an external shape adapted for smoothing the transition from the external diameter of said conductor insulation to the external diameter of said connector by providing an external conical transition with a relatively slow slope.

3. The cable joint according to claim 1, characterized in that said molded caps overlap each other in the middle of said connector.

4. The cable joint according to claim 1, characterized in that said insulating sleeve is a cold shrinkable joint-body adapted, when retracted, to cover said connector covered by said molded caps, the conductor insulation and part of the semi-conductive layer of both said cables.

5. The cable joint according to claim 4, characterized in that said cold shrinkable joint-body comprises an inner layer of insulating mastic, an intermediate layer of insulating material and an outer layer of semi-conductive material.

6. A method of forming a joint between two medium voltage electric power cables, each cable having a conductor surrounded by a conductor insulation itself surrounded by a semi-conductive layer, the end of the semi-conductive layer being cut-back to expose a bared end of said conductor insulation and the end of the conductor insulation being removed to expose a bared end of said conductor, wherein:

a molded cap, each having a first section with a first internal diameter adapted for being engaged over said conductor insulation and a second section with a second internal diameter adapted for being engaged over a connector;

the bared conductor ends of the two cables are connected together by means of said connector constituted by a bolted contact assembly having a tubular shape, said conductors ends being maintained therein by bolts; and the molded caps are slid over said connector until they joint each other with their second sections covering said connector, said caps having, between their first and their second sections, an internal shape adapted for mating the change in dimension between said first and said second internal diameter.

7. The method according to claim 6, wherein each of said molded caps has an external shape adapted for smoothing the transition from the external diameter of said conductor insulation to the external diameter of said connector by providing an external conical transition with a relatively slow slope.

8. The method according to claim 6, wherein said molded caps overlap each other in the middle of said connector.

9. The method according to claim 6, wherein an insulating cold shrinkable sleeve expanded over a support tube is slid over said connector covered by said molded caps and over the conductor insulation and semi-conductive layer of both said cables, and is then retracted thereon.

10. A tubular assembly for a cable joint adapted for covering a connector constituted by a bolted contact assembly adapted for connecting together bared ends of conductors of two medium voltage electric power cables, characterized in that said tubular assembly is constituted by two molded caps made of semi-conductive rubber and joining each other over said connector, and in that each of said molded caps has an internal shape adapted for being engaged over said connector and the insulation of said conductor and for mating the change in dimension between said connector and said conductor insulation.

11. The tubular assembly according to claim 10, characterized in that each of said molded caps has an external shape adapted for smoothing the transition from the external diameter of a conductor insulation of said cable to the external diameter of said connector by providing an external conical transition with a relatively slow slope.

12. The tubular assembly according to claim 10, characterized in that said molded caps are adapted to be used in said cable joint wherein: said conductor insulation is further surrounded by a semi-conductive layer and wherein said conductors are maintained in said bolted contact assembly by bolts, and where an insulating sleeve covers said connector.

13. The tubular assembly according to claim 10, characterized in that said molded caps are adapted to be used in a method of forming said joint between said two medium voltage electric power cables wherein the conductors are surrounded by a conductor insulation itself surrounded by a semi-conductive layer, the end of the semi-conductive layer being cut-back to expose a bared end of said conductor insulation and the end of the conductor insulation being removed to expose said bared end of said each conductor, said method including the steps of engaging said molded caps, each having a first section with a first internal diameter adapted for being engaged over said conductor insulation and a second section with a second internal diameter adapted for being engaged over said connector;

connecting together the bared conductor ends of the two cables by said connector constituted by said bolted contact assembly having a tubular shape, said conductors ends being maintained therein by means of bolts; and sliding the molded caps over said connector until they joint each other with their second sections covering said connector, said caps having, between their first and their second sections, said internal shape adapted for mating the change in dimension between said first and said second internal diameters.

* * * * *